Figure 1:
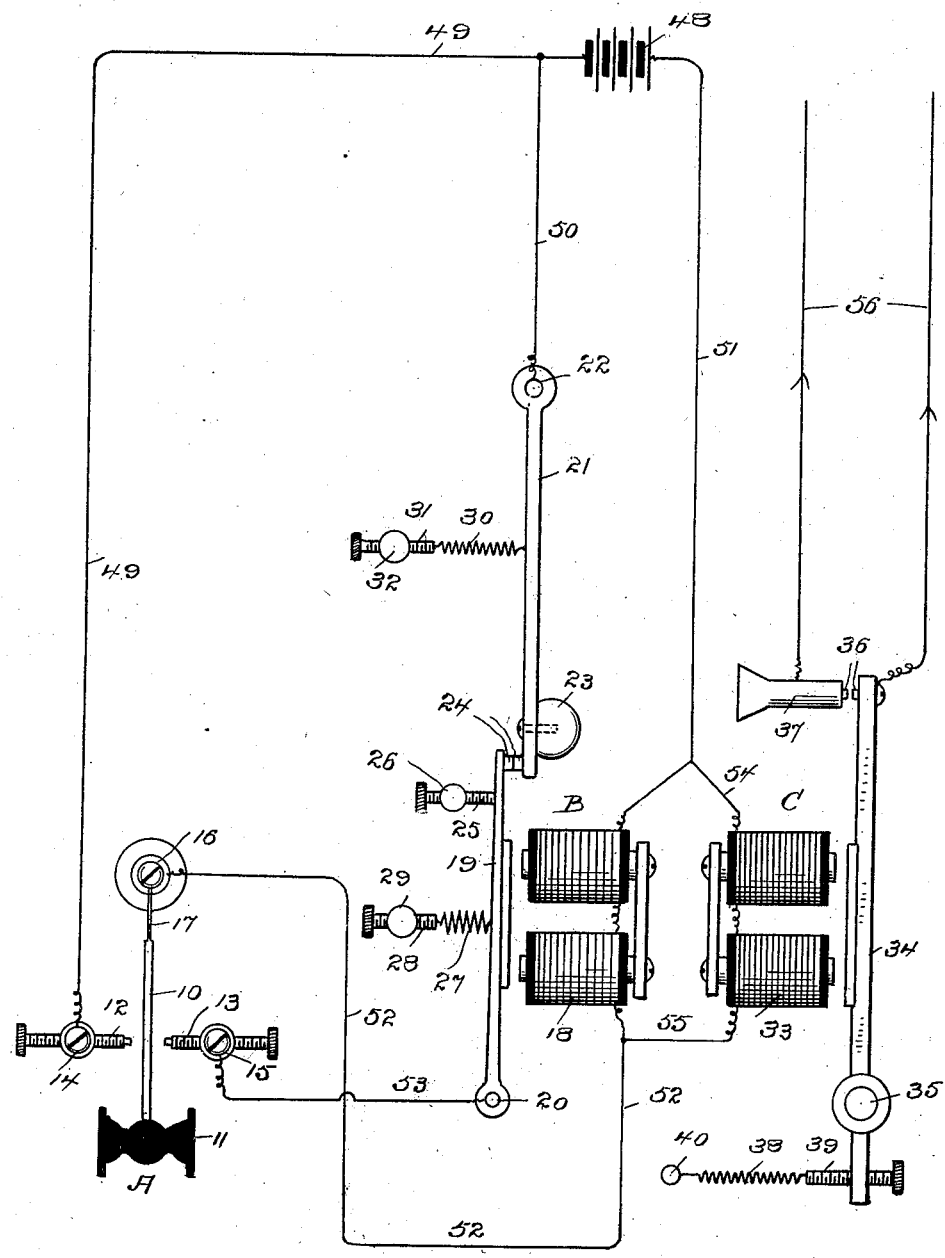

No. 732,648. PATENTED JUNE 30, 1903.
H. G. MARTIN.
TELEGRAPHIC TRANSMITTER.
APPLICATION FILED OCT. 6, 1902.
NO MODEL. 3 SHEETS—SHEET 1.

WITNESSES.
H. A. Lamb
S. W. Atherton

INVENTOR.
Horace G. Martin
By A. M. Wooster
Atty.

No. 732,648. PATENTED JUNE 30, 1903.
H. G. MARTIN.
TELEGRAPHIC TRANSMITTER.
APPLICATION FILED OCT. 6, 1902.
NO MODEL. 3 SHEETS—SHEET 2.

WITNESSES:
H. A. Lamb
S. W. Atherton

INVENTOR.
Horace G. Martin
By A. M. Wooster, Atty.

No. 732,648. PATENTED JUNE 30, 1903.
H. G. MARTIN.
TELEGRAPHIC TRANSMITTER.
APPLICATION FILED OCT. 6, 1902.
NO MODEL. 3 SHEETS—SHEET 3.

WITNESSES.
H. A. Lamb.
S. W. Atherton.

INVENTOR.
Horace G. Martin
By A. M. Wooster
Atty.

No. 732,648. Patented June 30, 1903.

UNITED STATES PATENT OFFICE.

HORACE G. MARTIN, OF BROOKLYN, NEW YORK, ASSIGNOR OF ONE-HALF TO WALTER P. PHILLIPS, OF BRIDGEPORT, CONNECTICUT.

TELEGRAPHIC TRANSMITTER.

SPECIFICATION forming part of Letters Patent No. 732,648, dated June 30, 1903.

Application filed October 6, 1902. Serial No. 126,055. (No model.)

*To all whom it may concern:*

Be it known that I, HORACE G. MARTIN, a citizen of the United States, residing at Brooklyn, county of Kings, State of New York, have invented a new and useful Telegraphic Transmitter, of which the following is a specification.

My invention relates to telegraphic transmitters, and has for its object, broadly, to provide an instrument of this character which shall retain all the merits of the Morse key, but shall be so constructed that it will make all dots automatically, leaving it in the power of the operator to adjust the length of the dots and leaving the spaces and dashes wholly at the control of the operator—that is to say, the operator may lengthen or shorten the dots, the spaces and dashes remaining at his control, or lengthen the spaces and dashes at will, the dots remaining constant. My invention, in other words, provides a simple and effective method of sending that wholly avoids the intense nervous strain of the Morse key and still retains its merits.

It is of course well understood that the letters of the Morse system consist of dots, spaces, and dashes. For example, the letter P consists of five dots, the letter C of two dots, a space and a dot, and the letter B consists of a dash followed by three dots. As an example of the expenditure of nerve force required of an operator by the Morse system it may be stated that the word "Mississippi" requires thirty-two depressions of the key and thirty-two relaxations of the pressure or upward movements. For each average word transmitted the operator must make twenty-four nerve exertions. An operator transmitting fifteen thousand words in eight hours, as many do, is compelled to depress the key one hundred and eighty thousand times and to release the key an equal number of times, making another one hundred and eighty thousand upward movements—that is, an average of three hundred and sixty thousand nerve exertions in eight hours. The result is that operators not infrequently completely lose control over the key, becoming victims of what is known as "telegrapher's paralysis." It is, in fact, beyond dispute that the terrible nervous strain of moderately-fast sending with the Morse key leads to various derangements of the physical, mental, and nervous systems, and, furthermore, that when the power of the sender begins to fail the strain upon the receiver is very greatly increased.

The evils above mentioned have led to the adoption of various means for lessening the nervous strain upon the sender and for assisting operators in the incipient stages of telegrapher's paralysis, some of which have given more or less relief, but none of which have been able to get away from the fundamental principle of the Morse key with the exception of the keyboard system, the objections to which are too well known to require mention.

In practice good Morse senders emphasize their sending as a person does his words in talking. The condition of the wire necessitates the emphasis of certain letters or portions of letters at times, the operator relying upon the "feel" of the wire at the instant that a letter or portion of a letter is to be formed and also on the ability of the receiver. This emphasis is accomplished almost entirely by lengthening or shortening the dashes and spaces, the speed of the dots remaining constant. It is an important feature of my present invention that this perfect control of the instrument and power to emphasize his sending is retained by the operator, while at the same time any number of dots may be produced by a single nerve exertion. As there are all classes of operators, it has been found that better time can be made by sending in one way to one operator and in another way to others, the different styles of sending not depending so much upon the variation of the speed of sending as a whole as upon variations of certain impulses in making dashes and also the ability to vary the speed of words or portions of words. These and kindred features have been the stronghold of the Morse key and the cause of the practical failure of all automatic transmitters heretofore devised.

In order to enable operators to greatly increase their speed and with a less consumption of nerve force, and to enable operators to send at an ordinary rate of speed very much easier than has heretofore been possible, and to enable operators afflicted with telegrapher's paralysis and who are practically unable to send with an ordinary Morse key to do good work, I have devised the novel telegraphic transmitter, of which the following description, in connection with the accompanying drawings, is a specification, reference characters being used to designate the several parts.

Figure 2:
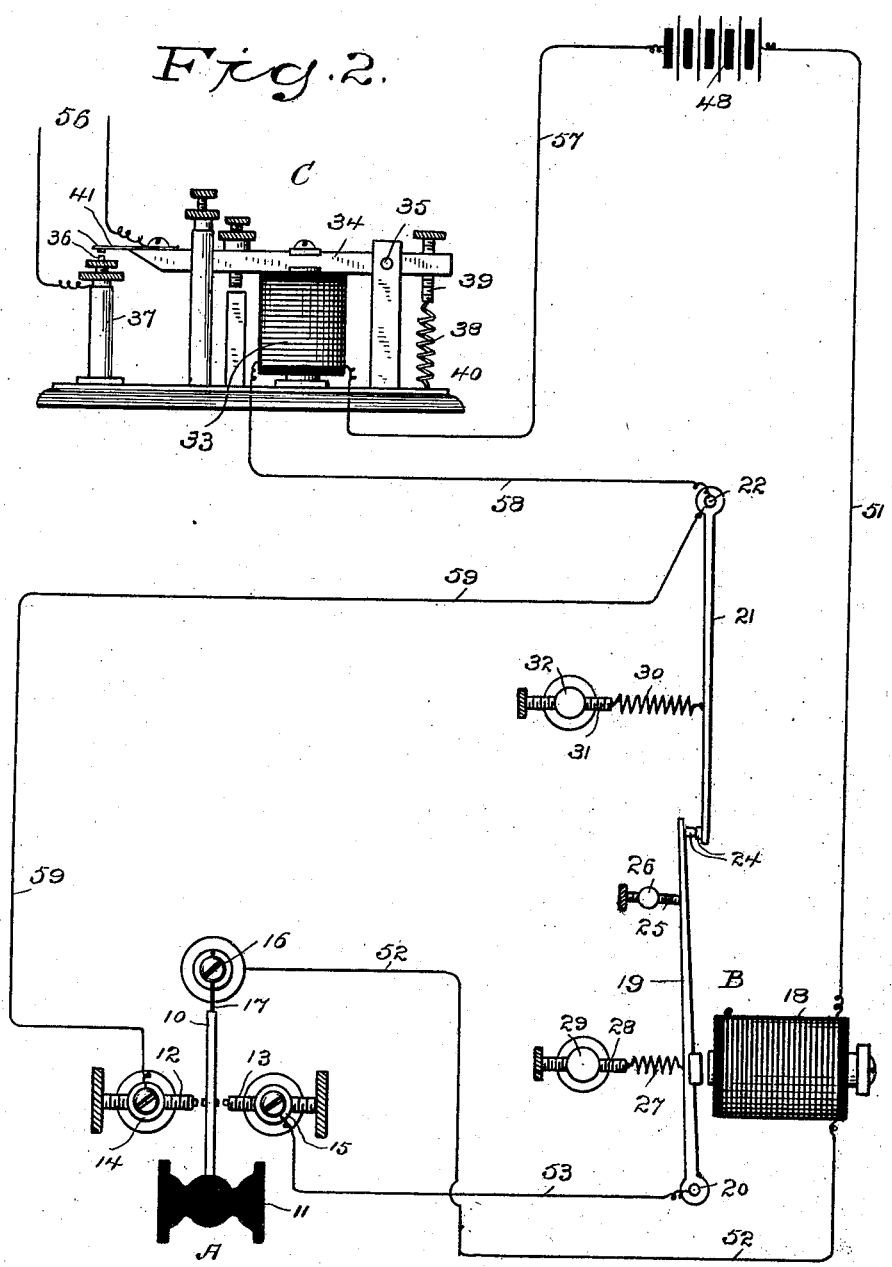
Figure 3:
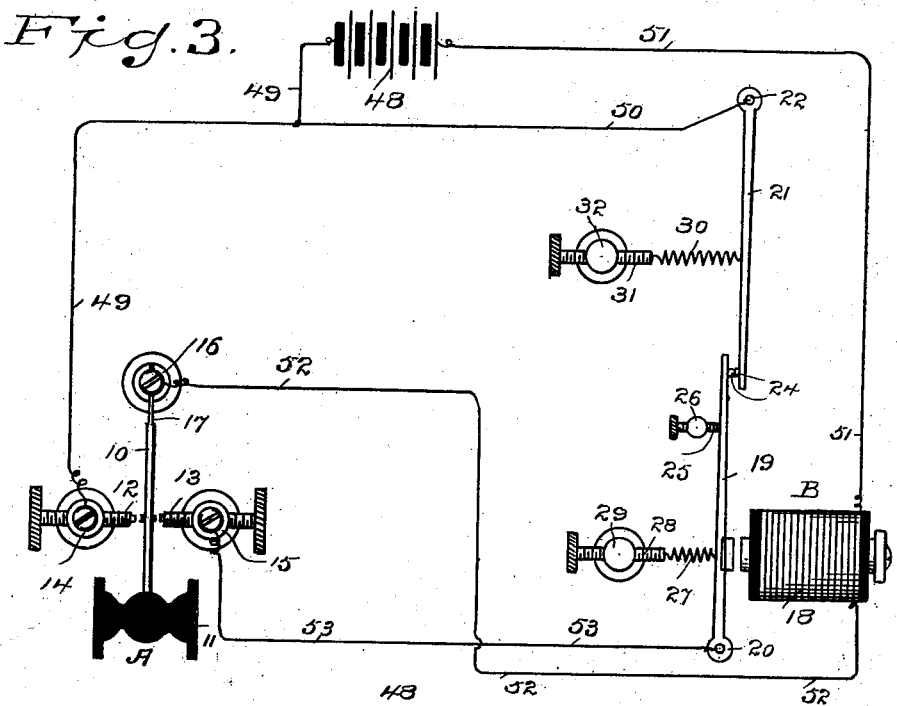
Figure 4:
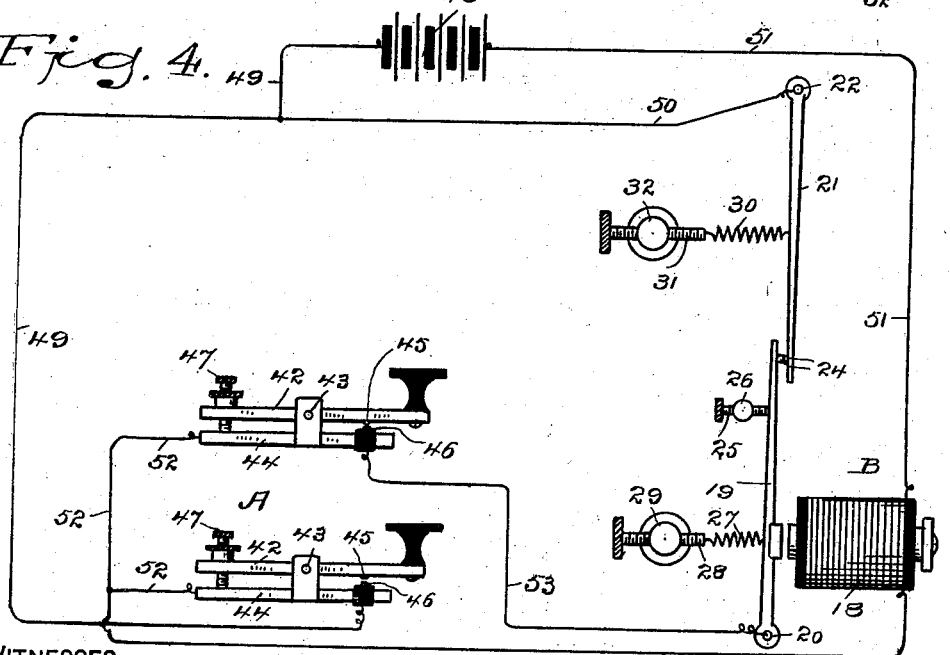

Figure 1 is a diagrammatic view illustrating a form of my invention which embodies a preferred form of key and also shows a repeating-sounder connected up in parallel with the electromagnet of the vibrator; Fig. 2, a similar view in which the repeating-sounder is connected up in series with the vibrator; Fig. 3, a view similar to Fig. 1, with the exception that the repeating-sounder is omitted; and Fig. 4 is a diagrammatic view illustrating a modified form of my invention in which I have shown two Morse keys connected up so as to comprise practically one key in lieu of the special form of key illustrated in Figs. 1, 2, and 3.

The essential features of my invention are a key, which I have indicated as a whole by A, a vibrator for making the dots, which I have indicated as a whole by B, and suitable electrical connections.

My preferred form of key consists of a lever 10, having a suitable finger-piece 11, which lies between adjustable contact-points 12 and 13, carried, respectively, by posts 14 and 15. Lever 10 is connected to a post 16 in such a manner as to permit it to be placed in engagement with either of the contact-points, but to normally retain it out of contact. In the present instance I have shown lever 10 as rigidly secured to a flat spring 17, which is itself rigidly secured to binding-post 16. It is obvious, however, that the special details of construction may be varied to an almost unlimited extent without departing from the principle of the invention. The vibrator comprises an electromagnet 18, having an armature 19, pivoted as at 20, and a pendulum 21, pivoted as at 22. The pendulum may be provided with a weight 23, as in Fig. 1, or the weight may be omitted, if preferred, as in the other views. The armature and the pendulum may be provided with corresponding contact-points 24. The armature is shown as normally held in contact with an adjustable back-stop 25, carried by a post 26 by means of a retractile spring 27, one end of which is connected to the armature, the other to a screw 28, carried by a post 29, whereby the tension of the spring may be adjusted. The contact-point upon the pendulum is shown as normally held in engagement with the corresponding contact-point upon the armature by means of a retractile spring 30, one end of which is connected to the pendulum, the other to a screw 31, carried by a post 32, whereby the tension of the spring may be adjusted. It is of course immaterial so far as the principle of the invention is concerned whether the key-lever swings in the vertical or the horizontal plane. The essential feature is that the key-lever is adapted to be swung between two fixed contact-points and is arranged to normally stand about centrally between them, touching neither. The contacts may be arranged one above and the other below the lever, so that upon either raising or depressing the lever the circuit is closed, but are preferably placed upon the opposite sides of the lever, as shown in the drawings. The mode of connecting or hinging the lever or of retaining it normally in a central position or the shape or form of the lever or finger-piece are of little importance and do not enter into the spirit of the invention.

In use when the key-lever is swung to one side—in the present instance the right side—it completes the circuit, presently to be described, through the winding of the vibrator-electromagnet, which is thus energized and attracts the vibrator-armature. The armature when its movement is stopped by contact with the poles of the electromagnet kicks the pendulum out of contact with itself, thereby breaking the circuit, this action continuing automatically so long as the lever is held to that contact and sending dots into the line. If the key-lever is thrown to the other contact—in the present instance the left—the vibrator-electromagnet is energized as before, but the vibrator contact-points are shunted or short-circuited. Therefore the circuit remains closed so long as the key-lever is held to that contact and a dash is sent into the line, as will be more fully explained.

In connection with my novel vibrator and key I may or may not use a repeating instrument, as a relay or a repeating-sounder, which I have indicated by C. In the present instance in Fig. 1 I have illustrated the use in connection with my novel vibrator and key of an ordinary form of repeating-sounder connected up in parallel with the coils of the vibrator-electromaget, and in Fig. 2 I have illustrated the use in connection with my novel vibrator and key of a repeating-sounder connected up in series with the vibrator. In Fig. 1 the repeating-sounder comprises an electromagnet 33, an armature 34, pivoted, as at 35, and provided with a contact-point 36, adapted to engage a similar contact-point 36 on a post 37. The contact-points upon armature 34 and post 37 are normally held out of contact by a retractile spring 38, one end of which is connected to a screw 39, carried by the armature, and the other to a fixed point, as at 40. The repeating-sounder illustrated in Fig. 2 differs from the one in Fig. 1 in that it is connected up with the coils of the vibrator in series, and contact-point 36 upon the armature is carried by a spring 41.

In the form of my invention illustrated in Fig. 4, in lieu of the special form of key illustrated in Figs. 1, 2, and 3, I use two ordinary Morse keys connected up so as to comprise practically one key. When the circuit is closed by one of the levers, (the upper one as seen in the drawings,) it causes the vibrator-electromagnet to be energized without shunting the vibrator contact-points, thus sending dots into the line, as in the other form, and when the circuit is closed by the other lever (the lower one as seen in the drawings) it causes the vibrator-electromagnet to be energized, but short-circuits the vibrator contact-points, the circuit being held closed by this lever while sending a dash into the line. 42 denotes the levers of these keys pivoted, as at 43, to bases 44.

45 denotes contact-points on the levers, 46 insulated contact-points on the bases, and 47 denotes the usual stop-screws.

My novel vibrator, the key, and the repeating instrument, if used, are connected up as follows: 48 denotes a battery from one pole of which a wire 49 leads to contact-point 12, and a wire 50 from the same pole is connected to pendulum 21. A wire 51 from the other pole of the battery leads to vibrator-electromagnet 18. A wire 52 leads from the vibrator-electromagnet to lever 10, and a wire 53 leads from armature 19 to contact-point 13.

The connections in the modified form illustrated in Fig. 4 differ from those in the other views only in that the wire 52, which in Figs. 1, 2, and 3 leads to the lever 10, in this form branches and leads to the bases 44.

Where a repeating instrument is used and connected up in parallel with the electromagnet of the vibrator, as in Fig. 1, a wire 54 leads from wire 51 to the electromagnet 33 of the repeating instrument, and a wire 55 leads from electromagnet 33 to lever 10 by way of wire 52.

56 denotes main-line wires leading from the repeating instrument.

Where a repeating instrument is used and connected up in series with the electromagnet of the vibrator, as in Fig. 2, a wire 51 leads from one pole of the battery to the electromagnet 18 of the vibrator. A wire 52 leads from electromagnet 18 to lever 10, and a wire 53 leads from armature 19 to contact-point 13, as in the other form. A wire 57 leads from the other pole of the battery to the electromagnet 33 of the repeating instrument, a wire 58 leads from electromagnet 33 to pendulum 21, and a wire 59 leads from wire 58 to contact-point 12.

The use of my novel telegraphic transmitter is as follows: Suppose, for example, that it was desired to make the letter "B," which is composed of a dash and three dots. The key-lever would be thrown to the left or dash side and held there for the proper length of time and then swung across to the right or dot side and held there until the vibrator produced three dots. In practice the operator depends upon the ear to tell when the proper number of dots has been produced. This can be done with great exactness, even by a novice. The speed of the dots and their length may be changed by varying the tension of pendulum retractile spring 30 and armature retractile spring 27 and by adjusting the armature back-stop 25. Varying either of these three adjustments causes the pendulum to be kicked out more or less in accordance with the adjustment. When the key-lever is thrown to the dot side—that is, to contact-point 13—the circuit is closed and the vibrator opens and closes the circuit automatically thereafter, each of these automatic impulses sending a dot into the line. The space between the dots can be lengthened by lightening the tension of the retractile spring, causing the pendulum to be kicked farther away by the armature-lever. It is thus left wholly in the power of the operator by manipulation of the adjustments described above to lengthen, shorten, or quicken both the dots and the spaces.

It is of course obvious that a vibrator to produce successful telegraphic dots must follow the action of the key practically instantaneously. This I accomplish perfectly with my novel construction. I have found it impossible, however, to produce the desired result with vibrators constructed on the plan of a vibrating bell or buzzer with the armature weighted or damped to secure reduction of speed. Vibrators constructed on the buzzer plan do not get into action quickly enough, and when they do it is with a varying rate of speed, the first of a series of dots, as in the letter "P," being relatively slow and the last part of the series fast.

In the form illustrated in Fig. 1, in which a preferred form of key is used and a repeating-instrument electromagnet is shown as connected up in parallel with the vibrator-electromagnet, when key-lever 10 is moved toward the right—that is, thrown to contact-point 13—the current passes from the positive pole of the battery over wire 51 to the electromagnets of both the vibrator and the repeating instrument, a portion of the current passing through electromagnet 18 of the vibrator and a portion passing through electromagnet 33 of the repeating instrument and uniting again at wire 52, then passing through key-lever 10 and contact-screw 13 to wire 53 and through armature 19, pendulum 21, and wire 50 to the negative pole of the battery. The action of the current is to magnetize the electromagnets of both the vibrator and the repeating instrument, causing their respective armatures 19 and 34 to be attracted. Armature 34 of the repeating instrument on being drawn down closes contacts 36, leading to the main line or other foreign circuit, as wires 56, and sends an impulse into said circuit, the length of the impulse varying in accordance with the adjustment of the vibrator mechanism. The vibrator-electromagnet, being energized by a portion of the same current that caused the attraction of armature 34 of the repeating instrument, therefore attracts its own armature 19, which carries pendulum 21 with it at a speed depending upon the tension of armature retractile spring 27 and the pendulum retractile spring 30. When armature 19 strikes the poles of electromagnet 18, which in this case act as a dead-stop therefor, the pendulum being unimpeded by anything except its retractile spring and having gained a certain momentum does not cease its forward movement instantly, but continues the forward movement until its momentum is overcome by retractile spring 30, thus breaking the vibrator-circuit through the pendulum and wire 50 to the battery. At the instant vibrator-armature 19 touches the poles of electromagnet 18, the circuit being broken between contact-points 24 at the ends of armature 19 and the pendulum, the electromagnets of the vibrator and of the repeating instrument are both demagnetized, armature 34 of the repeating instrument is moved away from the poles of electromagnet 33 by retractile spring 38, thereby breaking the main-line circuit, and the vibrator-armature 19 is moved away from the poles of electromagnet 18 by retractile spring 27 until said armature reaches back-stop 25, where it remains until the pendulum more leisurely returns to contact with the vibrator-armature, thereby closing the vibrator-circuit again, whereupon both electromagnets are again energized. This action continues automatically so long as key-lever 10 is held toward the right—that is, in engagement with contact-point 13, to which wire 53 is connected—each automatic impulse causing a kick of the pendulum and sending a dot into the line.

When the key-lever is moved toward the left—that is, thrown to contact-point 12—the current, as before, leaves the positive pole of the battery over wire 51, dividing through the vibrator-electromagnet and repeating-instrument electromagnet, uniting again at wire 52, and passing on through key-lever 10, contact-screw 12, and over wire 49 to the negative pole of the battery, thereby shunting or short-circuiting the contacts 24 between vibrator-armature 19 and the pendulum. This action energizes both the vibrator-electromagnet and the repeating-instrument electromagnet, the repeating-instrument armature being attracted, and consequently closing the main-line or foreign circuit at contacts 36, this circuit remaining closed so long as the key-lever is held to left-hand contact 12, leading to the shunt-circuit. As this action also energizes the vibrator-electromagnet, its armature 19 is attracted and carries the pendulum with it—i. e., kicks it out in precisely the same manner as when the key-lever was in contact with the opposite contact-point. When the key-lever is in contact with contact-point 12, however, the action of the vibrator is annulled by the shunt or short-circuit over wire 49. It will be readily understood, therefore, that the key-lever is thrown to the left—i. e., the shunt side—when it is desired to send a dash into the line.

When the repeating-instrument electromagnet is connected up in series with the vibrator-electromagnet and the armature and pendulum, as in Fig. 2, the action of the current is the same as in the other form; but instead of the current dividing and part passing through the vibrator-electromagnet and part through the repeating-instrument electromagnet and then reuniting the whole current passes from the positive pole of the battery over wire 51, through the vibrator-electromagnet, and through wire 52 to the key-lever. If the key-lever is held to contact-point 13, leading to wire 53, the whole current upon leaving the positive pole of the battery passes through the vibrator-electromagnet and armature and the pendulum and through the repeating-instrument electromagnet to the negative pole of the battery. This action energizes both the vibrator and the repeating-instrument electromagnets, and the operation is substantially the same as with the other form. When the key-lever is thrown toward the left—that is, to contact-point 12, with which a shunt or short-circuit wire 59 is connected—the circuit is closed upon both the vibrator and the repeating-instrument electromagnets and remains closed so long as the key-lever is held to that side, the only difference being that the entire current passes through both electromagnets, they being in series with each other instead of dividing and passing through the vibrator and repeating-instrument electromagnets in parallel, as in the other form. In the form illustrated in Fig. 2 the action of the vibrator is annulled by the shunt or short-circuit the same as in the form illustrated in Fig. 1.

In the form illustrated in Fig. 3 the repeating instrument, which is not an essential feature of the invention, is omitted. The action is the same as with the other forms, excepting, of course, the omission of the repeating instrument. The battery in this form may be at the distant end of the circuit, and the key and vibrator may be made to send impulses into the circuit in accordance with the principle of my invention without the use of a repeating instrument. The current, leaving the distant end of the circuit over wire 51, passes through the vibrator-electromagnet and through wire 52 to the key-lever, and if the key-lever was held to contact-point 13 the current would be through wire 53, vibrator-armature 19, and the pendulum back to the source of the current. The electromagnet would be energized, the armature attracted, and the pendulum carried thereby, i. e., kicked away from contact therewith, which would open the circuit, and the vibrator-armature would then return to contact with back-stop 25 through the action of retractile spring 27, and dots would be sent into the line the same as with the other forms. Should the key-lever be thrown toward the left—i. e., to contact-point 12—the vibrator would be short-circuited—that is, the current would flow steadily over wire 49 to the source of the current until the key-lever was released, and dashes would be sent into the line. In sending on the duplex or quadruplex the vibrator may be inserted directly in the local circuit of the pole-changer or transmitter.

In the form illustrated in Fig. 4 the action is substantially as in the forms illustrated in Figs. 1 and 2 if a repeating instrument is placed in the circuit and substantially the same as in the form illustrated in Fig. 3 if a repeating instrument is not used. The two Morse keys perform the same duty as the preferred form of key illustrated in the other forms—that is to say, one closes the vibrator-circuit, this circuit including the repeating instrument if used, and sends dots into the line, and the other shunts or short-circuits the vibrator contact-points while closing the circuit and sends dashes into the line, instead of these functions being performed by movement of a single key in opposite directions.

Having thus described my invention, I claim—

1. In a telegraphic transmitter, the combination with a vibrator comprising an electromagnet, an armature therefor, a pivoted pendulum whose free end is adapted to engage the armature, and retractile springs for said armature and pendulum, of a key, electrical connections leading from the source of supply through the electromagnet to the key and from one side of the key directly to the source of supply and from the other side of the key through the armature and pendulum to the source of supply, so that when the circuit is closed at one side of the key the current travels through the electromagnet and attracts the armature which in turn kicks the pendulum out of contact therewith and breaks the circuit, which action continues automatically sending dots into the line, and when the circuit is closed at the other side of the key the armature and pendulum are short-circuited and a dash is sent into the line.

2. In a telegraphic transmitter, the combination with a key comprising a lever and contact-points on opposite sides thereof, of a vibrator comprising an electromagnet, an armature therefor, a pivoted pendulum whose free end is adapted to engage the armature, and retractile springs for said armature and pendulum, and electrical connections leading through the electromagnet to the key-lever and from one contact-point directly to the source of supply and from the other contact-point through the armature and pendulum to the source of supply, so that when the key-lever is thrown to one contact-point the current travels through the electromagnet and attracts the armature which in turn kicks the pendulum out of contact therewith and breaks the circuit, which action continues automatically sending dots into the line, and if the key-lever is thrown to the other contact-point the armature and pendulum are short-circuited and a dash is sent into the line.

3. In a telegraphic transmitter, the combination with a vibrator comprising an electromagnet, an armature therefor, a pivoted pendulum whose free end is adapted to engage the armature, and retractile springs for said armature and pendulum, of a repeating instrument connected up in parallel with the vibrator, a key, and electrical connections leading from the source of supply through the vibrator and the repeating instrument to the key, and from one side of the key directly to the source of supply and from the other side of the key through the armature and pendulum to the source of supply.

4. In a telegraphic transmitter, the combination of an electromagnet, an armature therefor, a pivoted pendulum having its free end adapted to engage the armature and to be kicked to one side thereby, a key, and electrical connections leading from the source of supply through the electromagnet to the key, and from one side of the key directly to the source of supply and from the other side of the key through the armature and pendulum to the source of supply, for the purpose set forth.

5. In a telegraphic transmitter, the combination of an electromagnet, an armature therefor, a pivoted pendulum having its free end adapted to engage the armature and to be kicked to one side thereby, a key, retractile springs for said armature and pendulum and electrical connections leading from the source of supply through the electromagnet to the key, and from one side of the key directly to the source of supply and from the other side of the key through the armature and pendulum to the source of supply, for the purpose set forth.

6. In a telegraphic transmitter, the combination with a key comprising a lever and contact-points on opposite sides thereof, of an electromagnet, an armature therefor, a pivoted pendulum having its free end adapted to engage the armature and to be kicked to one side thereby, and electrical connections through the electromagnet to the key-lever and from one contact-point directly to the source of supply and from the other contact-point through the armature and pendulum to the source of supply, for the purpose set forth.

In testimony whereof I affix my signature in presence of two witnesses.

HORACE G. MARTIN.

Witnesses:
ORVORD BREWER,
I. W. CONNALLY.